United States Patent [19]

Steffen

[11] Patent Number: 4,736,907

[45] Date of Patent: Apr. 12, 1988

[54] PROCESS AND APPARATUS FOR PREVENTING BIRD COLLISIONS

[76] Inventor: Rüdiger Steffen, Haldenstrasse 673, CH-8425 Oberembrach, Switzerland

[21] Appl. No.: 13,413

[22] Filed: Feb. 11, 1987

[30] Foreign Application Priority Data

Mar. 4, 1986 [CH] Switzerland ............... 00880/86

[51] Int. Cl.⁴ .......................................... B64D 47/02
[52] U.S. Cl. ........................................ 244/1 R; 43/1; 340/981; 362/62; 315/241 S
[58] Field of Search ..................... 244/1 R, 114 R; 340/981, 982, 961; 43/1; 362/62, 63; 315/241 S

[56] References Cited

U.S. PATENT DOCUMENTS

| | | |
|---|---|---|
| 2,876,388 | 3/1959 | Bader et al. ............... 340/982 |
| 3,903,501 | 9/1975 | Greenlee et al. ........... 340/981 |
| 3,925,704 | 12/1975 | Camic ........................ 315/241 S |
| 4,477,796 | 10/1984 | Kearsley .................... 315/241 S |

FOREIGN PATENT DOCUMENTS 7908857 7/1981 Netherlands ............... 244/114 R

Primary Examiner—Galen Barefoot
Attorney, Agent, or Firm—Thomas W. Speckman; Ann W. Speckman

[57] ABSTRACT

The collision of birds with aircraft is prevented by means of at least one light source installed on an aircraft which produces light flashes. The frequency of the light flashes produced thereby is varied during at least one cycle time period. The frequency of light flashes is advantageously continuously increased one or more times in a range of from approximately 0.1 Hz to 3.0 Hz, and the maximum frequency may then be maintained. Two such light sources are preferably visible to the birds.

16 Claims, 1 Drawing Sheet

PROCESS AND APPARATUS FOR PREVENTING BIRD COLLISIONS

BACKGROUND OF THE INVENTION

1. Field of the Invention

Collisions with birds represent a considerable safety risk in aviation, particularly since faster aircraft have such high approaching speeds that within the prewarning time birds are unable to leave the collision area. For this reason, collisions with birds termed "bird impacts", frequently occur. A collision with one small bird does not, in general, cause great damage, although serious accidents have occurred. At sufficiently high speeds, however, and particularly with smaller jet aircraft, the impact can be so great that the body of the bird penetrates the cockpit wall or the forward edge of the wing. Cases are known in which people have been injured by bodies of birds penetrating the cabin. Particularly dramatic are collisions of commercial airlines with whole swarms of birds. Under certain circumstances, the engines may be stopped. Especially, the engines may be significantly damaged in such collisions. Large jet engines of commercial airlines produce considerable underpressure in their suction areas, which additionally increases the risk for birds in the danger zone of being sucked into the engine. The turbine blades of such engines are subjected to extremely high thermal and mechanical stresses. A bird being sucked in may, under certain circumstances, knock off a turbine blade. The immediately ensuing unbalance produces dangerous vibrations, so that the pilot must immediately shut off the affected engine. The engine turbine blade which has been knocked off can cause a great deal of damage in the interior of the engine. If the fuel feed system is damaged, the engine may catch fire. The material damages require tremendously expensive repairs, along with the aircraft out of service. Worldwide, about 200,000 bird impacts are registered every year, and the resulting damages entail costs of about 3 to 4 billion Deutsche marks. These figures alone demonstrate that a remedy is urgently needed.

2. Description of the Prior Art

Various means have previously been used to banish birds from the collision danger zone. Such measures are, for example, taking precautions to make an airport hostile to birds. Thus in many places, all trees and bushes have been removed to deprive the birds of any nesting opportunities. Furthermore, the grass on the land adjoining the runways is cut diligently as short as possible, to thereby reduce the feeding potential for the birds. Additionally grass which has been cut short allows the spotting of a swarm of birds sooner. Along with these natural measures, specially trained birds of prey may be settled on the grounds of the airport, and these birds will keep their territory free of rival birds. Various technical means have been used to chase birds away, such as for example, a stationary acoustical warning device, which cracks or blasts at irregular intervals. Also, various optical warning signals utilizing different colors, intensities, and blinking intervals have been used. All of these devices have proven to be only partially effective, but they have not been able to provide an efficient prevention of bird impacts. A cracking sound does, of course, alarm the birds, but there is no guarantee that the birds will fly away from the danger zone. Sometimes, they may even fly directly into the collision area, which they do not recognize as such due to the rapid approach of the airplane. Furthermore, a certain habituation to the sound often occurs, even if the crack or blast is emitted at irregular intervals, so that the effect is ultimately unsatisfactory in many cases.

Similar unsatisfactory results were obtained with optical warning devices. The birds soon become accustomed to all possible light colors and blinking lights. It is an object of the present invention to solve this problem and to provide a process and apparatus which effectively prevents the impact of birds with aircraft and to prevent all the negative consequences for aviation.

SUMMARY OF THE INVENTION

The objective stated above is attained by providing a process for preventing bird impacts with aircraft during the take off and landing phases of the aircraft, as well as during flight, by means of providing at least one light source on the airplane which produces flashes of light, and characterized in that the frequency of the light flashes produced is varied during at least one cycle period.

One advantage of this process is that this type of warning is designed to be specific for birds. A bird perceives the world entirely differently from human beings. Its senses operate entirely differently from human senses. Its hearing and eyes react to different frequency ranges. It is therefore necessary to develop a process for preventing bird collisions in close cooperation with researchers studying the behavior of birds. Results from this area of research demonstrate that bird behavior is determined essentially by visual means; that is, the sense of sight is dominant and primarily determinative of behavior. At the same time, birds are relatively unintelligent and strongly influenced by instinct. They have, for example, a pronounced instinct to escape, which is vital to their survival and which is triggered in a specific manner. If it is desired that a bird fly away in a specific direction, or away from a certain area, an instinct to escape must be produced, whereby the following three primary considerations are of great significance: attention, speed and direction.

The attention of the bird must be arrested, after which the instinct to escape is produced. In this connection, behavioral research shows that a flashing light substantially increases the attentiveness of birds. Even a blinking light increases the attention of the bird to a significant extent, relative to a stationary light condition. An actual flash of light, on the other hand, produces about ten times as great a level of attentiveness as a simple blinking light. The process of the present invention makes use of this fact. The brief flashing of the light source is therefore important, because it produces the so-called solar effect in birds. This means that a fleeing bird tends to fly in a direction toward a bright light, even if this is a blinking light. On the other hand, this effect is not observed with a flashing light.

It is obvious that a bird will escape faster, the faster a potential enemy approaches it. The process of the present invention therefore makes use of the fact that a strobe light flashing at an increasing frequency gives a bird the impression of a rapidly approaching enemy, so that it flees at a high speed from this flashing light source. With a uniform flashing frequency, the birds display a less pronounced escape reaction. After extensive experiments, an increase in the flashing frequency in the range of about 0.1 Hz to about 3.0 Hz proved to be the most effective. Even after long-term use, a strong escape reaction away from the flashing light was provoked in the birds.

The simple scaring of the birds cannot alone prevent a bird impact. It is necessary that the birds leave a certain area, namely, the collision zone, and in addition, that they remain outside this area and not return to the collision zone after being scared away.

A further, and very important point, is that the process utilizes two light sources which are visible to the bird. In this way, it is easier for the bird to determine the direction and speed of the flashing lights, so that it can fly in the direction away from and not into the path of the approaching aircraft.

Light sources for executing the process in accordance with the present invention are preferably installed on the aircraft so that two light sources are always visible to birds in the danger zone. The danger zone includes, on the one hand, the actual collision zone, which comprises the cross-sectional profile of the aircraft along its flight path. The danger zone also includes, on the other hand, the space from which a bird can escape into the collision zone within the approach time of the aircraft. This space is delineated approximately by a cone which extends forward from the wingtips of the aircraft, the opening angles of which become smaller, the faster the aircraft moves. In a commercial airliner which is taking off with a take-off speed of approximately 80 m/s, this opening angle amounts to about 15°. If the aircraft is taxiing at the flying speed of the bird, the angle amounts to approximately 90°. Installation of the light sources is therefore advantageously carried out on both wings, most preferably in the area of the engines. It has been found in tests that the ideal cycle time for the light sources corresponds approximately to the time from taxiing up until take-off, approximately 20 to 30 seconds, and the flashing frequency during one cycle is preferably increased from approximately 0.5 Hz to approximately 2.0 Hz. Since the ideal cycle time is dependent upon the type of aircraft, the apparatus of the present invention provides for variable selection of the cycle time. The cycle may proceed successively, either once or repeatedly, since the frequency of flashing returns to the initial value after each cycle. After the expiration of one or more cycles, the light source or sources advantageously flash at the maximum end frequency, until the device is switched off again.

The light source itself preferably comprises a discharge lamp, which produces a very dazzling and rapidly flashing light, which is particularly well suited for the execution of the process of the present invention. This discharge lamp may be provided with current by means of an onboard power system and may be controlled by means of a special control unit in the form of a microprocessor. Various cycles and frequencies may be programmed into its storage memory and may then be individually recalled by making a corresponding program selection. Cycles and flashing frequencies are thereby available and can be selected for the types of birds which need to be scared away, and the speeds of the corresponding types of aircraft. The illumination time of each flash is preferably short to produce the most dazzling high intensity light flashes possible. With corresponding lamps, however, longer illumination times may be achieved in the range of the lower initial frequencies, which times become shorter with increasing flashing frequencies.

BRIEF DESCRIPTION OF THE DRAWINGS

One embodiment of an apparatus suitable for carrying out the process of the present invention is illustrated in diagrams in which.

DESCRIPTION OF PREFERRED EMBODIMENTS

Figure 1:
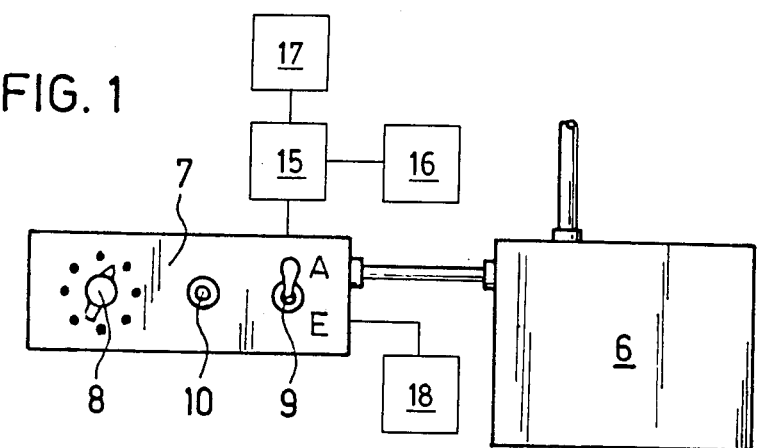
FIG. 1 shows a light source with a control unit and a power supply.

As shown in FIG. 1, light source (1) comprises a reflector (2) and a discharge tube (3), which are accommodated in a housing (4), which is shaped in an aerodynamically favorable manner. On its forward side, housing (4) may be sealed with a glass disk (5) positioned obliquely to the direction of flight. This may be heated to ensure the penetration of the full intensity of light. One side of housing (4) is substantially flat. This makes it possible to subsequently attach the apparatus below and on a wing of the aircraft. Discharge tube (3) may be energized by power supply (6), in which a condensor is continuously charged with current from the onboard power supply. The discharge tube (3) is controlled by control unit (7) which comprises a microprocessor, in which various flashing frequencies and cycle durations are stored. The programmed frequencies and cycle durations may be individually selected by means of a program selector switch (8). The process may be activated by means of a simple on/off switch (9), and deactivated in the same way, as shown in FIG. 1. Control lamp (10) lights up when the device is in operation.

Figure 2:
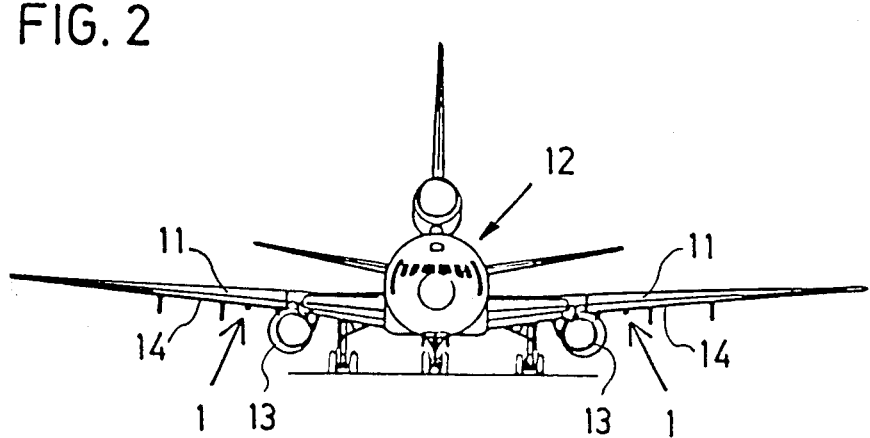
FIG. 2 shows an advantageous installation of the light source on an aircraft.

FIG. 2 shows the possible and advantageous installation placement of two light sources (1) on the wing (11) of an aircraft (12). The light sources are located on the lower side (14) of wing (11), near engines (13), which are particularly endangered. In that location, airflow over the profile of the wing is not impaired, and the lift is therefore not reduced, or only minimally reduced.

The process of the present invention may be initiated by means of various release circuits. In the simplest manner, this occurs when the pilot activates control unit (7) by means of a separate switch (9). He generally does so immediately before taxiing out and before the throttle is pushed forward. As soon as he judges the ascent to be adequate, he again deactivates the apparatus. By means of this switching device, it is also possible for the pilot to activate the bird-alarming lights, which may be referred to as "ABC Lights" (Anti-Bird-Collision Lights), according to his own best judgment in any situation, even in flight and particularly during take off and landing.

Other switch means may be specially provided for automatically switching on and off the ABC lights. For example, the control unit may be switched on and off by a switching relay means (15), which may be controlled by means of an on-board, acceleration-sensitive device (16). As soon as the acceleration-sensitive device (16) registers that a certain acceleration value has been exceeded, it activates the relay means (15) which then activates the control unit. A timing means (17) then ensures that the relay means (15), after a predetermined time, deactivates the control unit. According to another embodiment, the ABC lights may be controlled by means of a special on-board radar system (18) which responds to birds in the danger zone, and then, by means of a switching relay, automatically activates the ABC lights as soon as birds are detected. The ABC lights then remain on until the radar no longer detects any birds in the danger zone.

I claim:

1. A process for preventing bird collisions with aircraft during the take-off and landing phases of the aircraft and during flight by means of providing at least one light source on the airplane, said light source producing light flashes during at least one cycle, characterized in that the frequency of said light flashes produced is continuously increased during said at least one cycle.

2. A process in accordance with claim 1, characterized in that the frequency of said light flashes during each said cycle is continuously increased from a minimum of about 0.1 Hz to a maximum of about 3.0 Hz, and each said cycle has a duration of about 10 seconds to about 40 seconds.

3. A process in accordance with claim 2, characterized in that said light source is activated for a plurality of cycles, said light source remains activated after the last said cycle, and said frequency of said light flashes after termination of the last said cycle is maintained at the maximum frequency of the last said cycle.

4. A process in accordance with claim 2, characterized in that said light source is activated for a single said cycle.

5. A process in accordance with claim 2, characterized in that said light source is activated for a plurality of said cycles.

6. A process in accordance with claim 1, characterized in that said light source is activated for a plurality of cycles, said light source remains activated after the last said cycle, and said frequency of said light flashes after termination of the last said cycle is maintained at the maximum frequency of the last said cycle.

7. A process in accordance with claim 1, characterized in that said light source is activated for a single said cycle.

8. A process in accordance with claim 1, characterized in that said light source is activated for a plurality of said cycles.

9. An apparatus for preventing bird collisions with aircraft during the take-off and landing phases of the aircraft and during flight, said apparatus comprising a light source, a control unit comprising a microprocessor having a programmable memory means storing a plurality of preset programs, said control unit activating said light source during at least one cycle and producing light flashes at continuously increasing frequencies according to said preset programs, and a program selection means for individually selecting a preset program to activate said light source according to a preset cycle time and flashing frequency.

10. An apparatus in accordance with claim 9, additionally comprising an aerodynamically shaped housing (4) accommodating said light source, said housing comprising an integrated unit for installation on said aircraft.

11. An apparatus in accordance with claim 10, additionally comprising a separate switch means (9) in communication with said control unit (7) provided in the cockpit of said aircraft for activating said control unit (7).

12. An apparatus in accordance with claim 11, additionally comprising a switching relay means (15) in communication with said control unit (7), said switching relay means (15) responsive to an on-board acceleration-sensitive device (16) for activating said control unit (7), and a timing means (17) in communication with said switch relay means (15), for deactivating said control unit (7), after a predetermined time has elapsed.

13. An apparatus in accordance with claim 12, additionally comprising an on-board radar system (18) in communication with said control unit (7), said on-board radar system responsive to the presence of birds within a defined collision danger zone to automatically activate and operate said light source according to a preset program as long as said radar system detects the presence of birds in said defined collision danger zone.

14. An apparatus in accordance with claim 9, additionally comprising a separate switch means (9) in communication with said control unit (7) provided in the cockpit of said aircraft for activating said control unit (7).

15. An apparatus for preventing bird collisions with aircraft during the take-off and landing phases of the aircraft and during flight, said apparatus comprising a light source, a control unit (7) comprising a microprocessor having programmable memory means storing a plurality of preset programs, a switching relay means (15) in communication with asid control unit (7), said switching relay means (15) responsive to an on-board acceleration-sensitive device (16) to activate said control unit (7), thereby activating said light source during cycles of varying duration and producing light flashes of variable frequencies according to said preset porgrams, a timing means (17) in communication with said switching relay means (15) for deactivating said control unit (7) after a predetermined time has elapsed, and a program selection means for individually selecting a preset program to activate said light source according to a preset cycle time and flashing frequency.

16. An apparatus for preventing bird collisions with aircraft during the take-off and landing phases of the aircraft and during flight, said apparatus comprising a light source, a control unit (7) comprising a microprocessor having programmable memory means storing a plurality of preset programs, said control unit (7) activating said light source during cycles of varying duration and producing light flashes of variable frequencies according to said preset programs, an on-board radar system (18) in communication with said contorl unit (7), said on-board radar system responsive to the preence of birds within a defined collision danger zone to automatically activate and operate said light source according to a preset program as long as said radar system detects the presence of birds in said defined collision danger zone, and a program selection means for individually selecting a preset program to activate said light source according to a preset cycle time and flashing frequency.

* * * * *